United States Patent [19]

Demick et al.

[11] 4,158,491
[45] Jun. 19, 1979

[54] PHOTOGRAPHIC FILM PROJECTION DISSOLVE SYSTEM FOR ARC LAMP PROJECTORS

[75] Inventors: Eugene Demick, Ridgewood, N.J.; Adrian J. Van Haasteren, Jr., New York, N.Y.

[73] Assignee: Bergen Expo Systems, Inc., Clifton, N.J.

[21] Appl. No.: 860,286

[22] Filed: Dec. 14, 1977

[51] Int. Cl.² ............. G05D 25/00; G03B 21/14
[52] U.S. Cl. ............................ 353/90; 310/29; 350/269; 353/93
[58] Field of Search ............. 353/86, 90, 93; 350/269, 270; 310/29, 36

[56] References Cited

U.S. PATENT DOCUMENTS

| 837,942 | 12/1906 | Martincourt | 353/90 |
| 887,839 | 5/1908 | Patterson | 353/90 |
| 2,031,361 | 2/1936 | Bowen | 353/90 |
| 3,447,111 | 5/1969 | Coakley et al. | 310/36 |
| 3,514,191 | 5/1970 | Hoskin | 350/269 |
| 3,922,081 | 11/1975 | Uchido et al. | 353/86 |

FOREIGN PATENT DOCUMENTS 2011994  9/1971  Fed. Rep. of Germany.

Primary Examiner—Steven L. Stephan
Attorney, Agent, or Firm—Eliot S. Gerber

[57] ABSTRACT

A photographic film projection system includes a plurality of projectors, one of which is an arc lamp projector, and a dissolver instrument whose controlled output power to the arc lamp projector is a phase controlled average a.c. power. The arc lamp projector has a light valve comprising a motor means linearly responsive to average power, for example, a moving iron galvanometer, and a movable means, such as a louvre, positioned between the arc lamp and the film gate.

13 Claims, 9 Drawing Figures

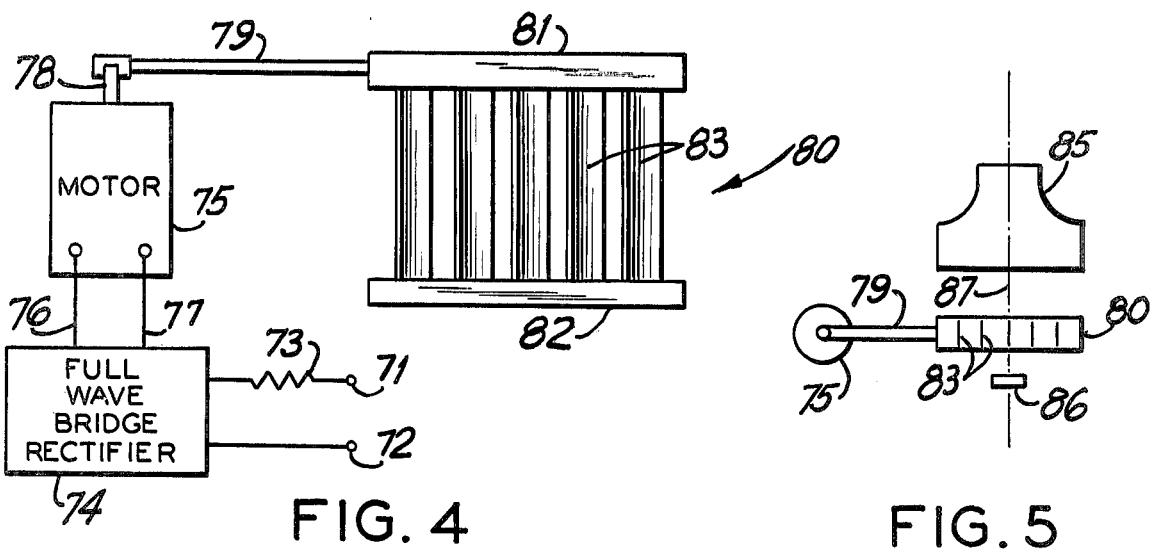
FIG. 4
FIG. 5
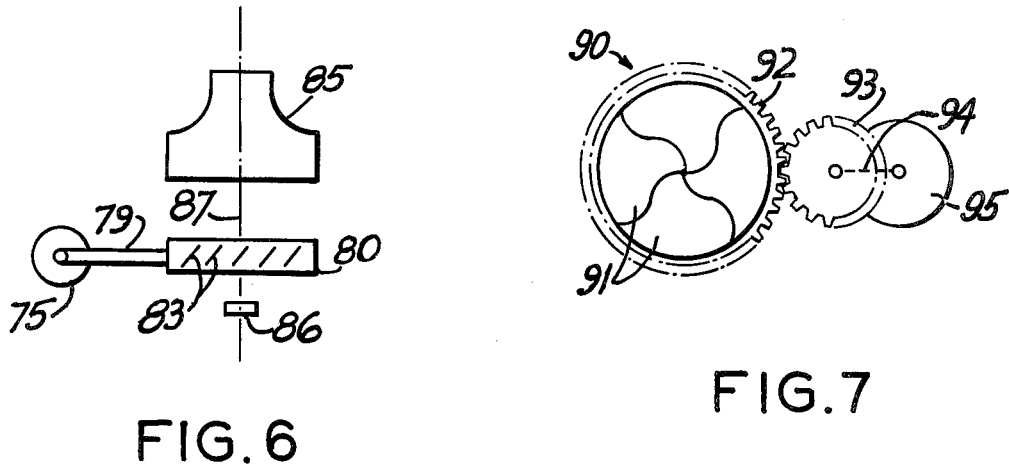
FIG. 6
FIG. 7
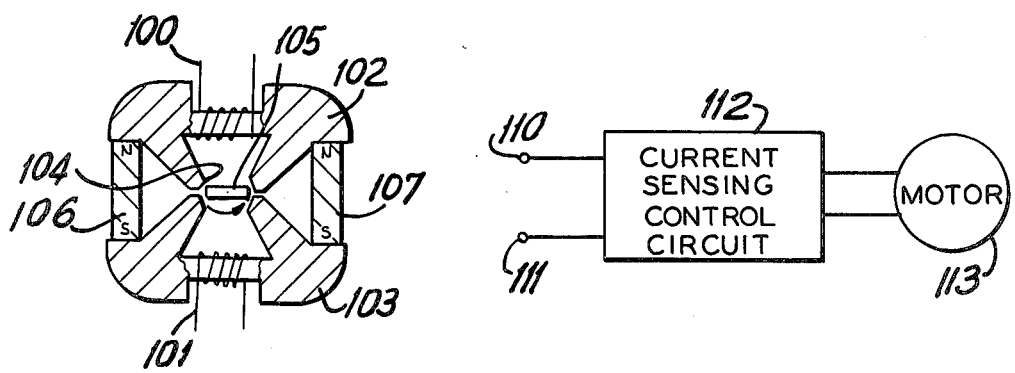
FIG. 8
FIG. 9

PHOTOGRAPHIC FILM PROJECTION DISSOLVE SYSTEM FOR ARC LAMP PROJECTORS

BACKGROUND OF THE INVENTION

The present invention relates to photographic film projection systems, such as photographic film slide projectors and motion picture projectors, and more particularly to a system utilizing a plurality of such projectors and which provides for dissolves, laps and other special effects between the various projectors.

At the present time it is known that a plurality of photographic film projectors may be used to present a slide show or motion picture show on a single projection surface such as a screen. For example, two slide projectors may be directed at the same screen and may be timed to present slides alternatively or in some other order. When the first slide projector is "on," i.e., its lamp is lighted, an image on the screen is projected from its slide. The first slide projector may then be turned "off," i.e., its lamp dimmed so that it is effectively extinguished, and a second slide projector, also directed at the same area on the same screen, may be turned on, projecting an image from the photographic film slide in the second projector. The use of a multiplicity of projectors has found especially wide favor in many contexts, including industrial exhibits, multi-media presentations, stage presentations and educational slide film presentations.

It is also known at the present time that the transition from one projector to the other may be made by a control instrument either by means of a manual switch or by means of a program device connected to that control instrument. The transition from one projector to the other may be made slowly so that the light from the first projector gradually fades while the light from the second projector gradually increases. This type of changeover, with its gradual increase and decrease of light, is called in this context a "dissolve" and the control instruments are termed "dissolve instruments," the term used herein, or "dissolvers" or "dissolve modules," although they are generally capable of other control functions in addition to dissolving of images. Prior to such lamp control dissolver instruments it was known to obtain a dissolve in a single projector using an iris diaphragm, as in U.S. Pat. No. 887,839, or a louvre diaphragm, as in U.S. Pat. No. 837,942.

There are a number of such presently commercially available dissolver instruments. In general, the dissolver instruments have two or more multi-terminal connector portions which receive another portion of the connector from two or more slide projectors. In addition, they have manually operated switches (i) determining whether the control is operated manually or from an external program device, (ii) for reversing the image from one projector to another, (iii) a lap control switch, and (iv) a lap dissolve control.

These dissolver instruments, in general, operate quite satisfactorily with projectors using incandescent lamps, for example, the incandescent lamp slide projectors of the types manufactured by Kodak and Bell & Howell. Certain incandescent bulb slide projectors may be modified by insertion of a higher wattage incandescent bulb and there are presently commercially available such modified slide projectors having bulbs to 1200 watts. However, even the larger size bulbs, namely, the 1200 watt bulbs, do not produce a sufficient lumen output in many applications, particularly in use in stage presentations, theaters, or where the presentation is under daylight conditions. In addition, such large incandescent bulbs are very hot and must be cooled, and may last for only 12–20 hours of projection time.

There are also presently commercially available a number of slide projectors which use arc lamps as their light source; for example, a xenon lamp projector is available from Bergen Expo Systems, Inc. of Clifton, N.J. Such arc lamps produce a relatively high level of illumination and provide a relatively long useful life. However, the dissolve instruments presently available cannot be used with arc lamps because they operate by regulating the current to the lamp. When the current to an incandescent bulb is decreased, the bulb becomes decreasingly bright, i.e., the bulb dims in proportion to the decrease in current. However, if current is decreased to an arc lamp such as a xenon bulb, the arc becomes extinguished.

It is not possible, consequently, to dim an arc lamp in proportion to the current regulated by dissolve instruments. The programs prepared by directors are generally prepared on slide projectors using incandescent bulbs which are readily available in many studios. However, those programs, either manual clues or an automatic program, cannot then be utilized with the more powerful arc lamp type of projectors.

There are available a number of special arc lamp projectors which have built-in dissolve and lap controls. It is necessary for the user to evolve an entirely new program for these special arc lamp multiple projectors and to learn to use their special controls. He cannot use the dissolver instruments with which he has become familiar or with which the original program was prepared. One of these types of multiple projector instruments having dissolve controls is Model 5-12, manufactured by Optical Radiation Corp. It is a large instrument, difficult to ship, incorporating two projectors, a complex motor driven mirror system, and a single arc light source. The mirror system shifts the light source from one projector to the other under control of the instrument's internal system. In another double projector system, shown in U.S. Pat. No. 3,358,558, light from either one projector or the other may be blocked by opaque masks which may be positioned in front of the projectors.

OBJECTIVES AND FEATURES OF THE PRESENT INVENTION

It is an objective of the present invention to provide a photographic film projection system utilizing a plurality of projectors, each having a high intensity arc lamp, which projectors are controlled for dissolve and other effects utilizing certain commercially available dissolver instruments.

It is a further objective of the present invention to provide such a system having a light valve in each arc lamp projector, which light valve is positioned between the arc lamp and the film gate so that the light reaching the film gate may be accurately controlled under the control of the dissolver instrument.

It is a further objective of the present invention to provide such a system in which the light valve is relatively low in cost and has a relatively simple mechanical operating mechanism so that it is reliable in field usage if the projectors should be shipped from one location to another.

It is a further objective of the present invention to provide such a system in which the automatic or manual programs developed using a dissolver instrument and a plurality of projectors having incandescent lamp light sources may be utilized with the same dissolver instrument for which the program was developed and one or more projectors having an arc lamp light source.

SUMMARY OF THE INVENTION

In accordance with the present invention a system is provided in which, either manually or under control of an automatic program device, one or more photographic film projectors may be accurately and readily controlled as to dissolving and other effects.

The system comprises one or more projectors utilizing a high energy high light arc lamp such as a xenon lamp. Such lamps may be utilized with a slide projector to produce an image on a screen having a high light intensity; for example, such projectors may be used in large auditoriums or during daylight.

In the system of the present invention the arc lamp projectors are connected to a certain type of commercially available dissolver instrument which operates by phase control of an alternating current supply. The dissolver instrument connects the load, in this case the load being a special motor device, to an a.c. supply and provides a rapid on-off switching for a controlled fraction of each cycle. The phase controlled a.c. current is supplied from the dissolver instrument to a current responsive motor device which is a moving rotor (moving iron) galvanometer, although other types of galvanometer type instruments, such as a moving coil galvanometer, may alternatively be used. The galvanometer motor device is connected through a set of linkages to a light interrupting device which is preferably a set of parallel opaque and rotatable strips forming a louvre. That louvre is positioned between the arc lamp and the film gate and acts as a light valve controlling the amount of light to the film gate. The galvanometer motor device's rotor is directly and accurately responsive, in its rotational movement, to the average current as determined by the phase control of the dissolver instrument. The galvanometer motor device may completely open or completely close the louvre or may move the louvre from open to close at any selected rate of speed or may cause the louvre to hover (remain) at any selected position, for example, 30% of completely open, for any selected period of time.

It is a feature of the present invention to provide a system for the projection of photographic film utilizing a plurality of photographic film projectors. A dissolver instrument is connected to the projectors and to a source of a.c. power. The dissolver instrument includes power control means which regulate its average output power to the projectors by means of phase control. At least one of the projectors has an arc lamp light source, a film gate and a light valve means positioned between its arc lamp and its film gate.

The light valve comprises a motor means connected to the dissolver instrument, the motor means having a rotor whose angle of rotation is directly related to the average output power. For example, the motor means may be a moving iron galvanometer motor. A movement means is connected to the rotor and moved to relatively open, closed and intermediate positions dependent upon the angular position of the rotor to thereby control the amount of light reaching the film gate from the arc lamp.

It is a further feature of the present invention to provide a high lumen output photographic film slide projector adapted to be connected along with other slide projectors to a dissolver instrument. The power output of the dissolver instrument is a phase controlled average power. The projector comprises an arc lamp light source, a motor driven slide transport mechanism and a film gate in proximity to the slide to be projected.

The projector further includes a light valve which comprises a motor means and a movement means. The motor means is connected to the dissolver instrument and has a rotor whose angle of rotation is directly related to the average output power from the dissolver instrument. The movement means, such as a louvre of opaque parallel slates, is connected to the rotor and moved by it to relatively open, closed and intermediate positions dependent upon the rotor's angular position to thereby control the amount of light from the arc lamp falling on the film gate.

BRIEF DESCRIPTION OF THE DRAWINGS

Other objectives and features of the present invention will be apparent from the following detailed description which should be taken in conjunction with the accompanying drawings.

In the drawings:

FIG. 4 is a diagram showing the light valve of the present invention in which the movement means is shown in front plan view;

FIGS. 5 and 6 are top views illustrating the positioning of the movement means of the present invention;

FIG. 7 is a front plan view of an alternative movement means showing an iris diaphragm;

FIG. 8 is a cross-sectional view illustrating a moving iron galvanometer motor; and FIG. 9 is a block diagram showing the motor control of the present invention.

DETAILED DESCRIPTION OF THE INVENTION

Figure 1:
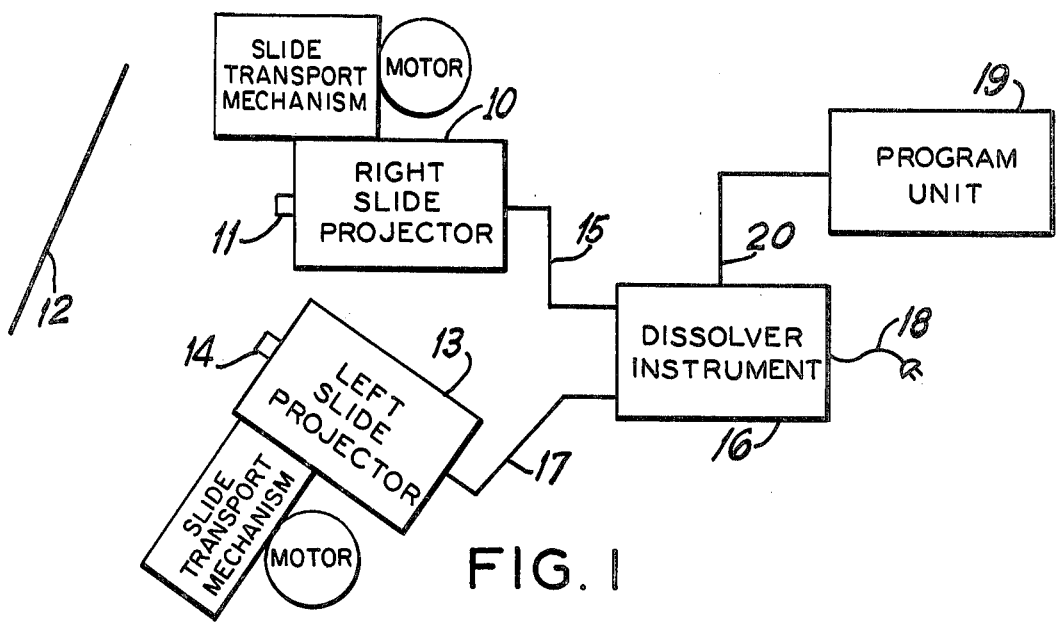
FIG. 1 is a block diagram of the photographic film projection system of the present invention.

The system according to the present invention for the projection of photographic film is shown in FIG. 1. In that figure a first photograph slide film projector 10 has its projection lens 11 directed so that the images from its slides appear on the screen 12. Similarly, a second photographic slide projector 13 has its projection lens 14 directed so that the images from its slides are also shown on the screen 12.

The first slide projector 10 is connected by a multi-wire cable 15 to the dissolver instrument 16. Similarly, the second slide projector 13 is connected by multi-wire cable 17 to the dissolver instrument 16. The slide projectors 10 and 13 each utilize an internal light source which is directed through their film gates. It is preferred to use slide film projectors having a motor mechanism so that the slide is changed under command of an electrical pulse, a suitable example being the "Ektagraphic" slide projectors using a "Carousel" circular slide transport mechanism manufactured by Kodak of Rochester, N.Y. Other types of automatic motor driven slide transport mechanisms may alternatively be utilized.

The light source of at least one of the slide projectors 10,13 is an arc lamp. Arc lamps, as compared to incandescent bulbs, produce a high lumen output which is necessary when the slide is projected upon a large screen or under daylight conditions. A suitable arc lamp is a xenon bulb, for example, the type described in the copending application Ser. No. 736,237 entitled "Segmented Sectional Reflection For The Projection Of Light Beams And Its Method of Production," whose named inventor is Maurice Levis, which application, as to its description, is incorporated by reference herein.

The dissolver instrument 16 is connected by line 18 to a conventional source of a.c. 110-volt power. The dissolver instrument may be of various commercially available types, for example, the "Mark II" dissolve module available from Audio Visual Laboratories, Inc., Atlantic Highlands, N.J. Generally such dissolve instruments may be either operated manually or from an automatic program. By manual operation is meant that an individual manually operates the various switches on the dissolver instrument. Automatic or program control is obtained by means of a separate program unit 19 connected to the dissolver instrument 16 by control cable 20. The program unit 19 may be of the type using punched tape, punched cards or magnetic tape. In any event, the program tape provides a system of timed electrical pulses to the dissolver instrument, which pulses control the various functions of the dissolver instrument.

A typical dissolve unit would provide the functions of dissolving, cuts and reversals. Dissolving is the gradual changeover from slide projector 10 to slide projector 13 with the light gradually dimming from slide projector 10 and the light gradually increasing from slide projector 13. Reversals would be the quick changeover from slide projector 10 to the image from the slide projector 13, or vice versa. Sometimes the dissolve instrument may take two projectors; however, larger size dissolve instruments may control three, four or even more projectors.

A typical sequence of control functions may be explained in connection with the dissolver instrument. In a "lap dissolve" there is a blending from one visual image to the next. The timing may be set by a knob so that the dissolve rates may be, for example 1 to 10 seconds. In the reversal lap dissolve, using an incandescent bulb, the lamp of one projector is gradually turned on to its full setting and held on for a predetermined time, for example, 7 seconds. At the end of the 7 seconds the bulb is gradually dimmed and the bulb of the other slide projector gradually made brighter. The slide in the first slide projector is changed after its bulb has been dimmed. To repeat the cycle the new slide is put in position in the first projector and its bulb is gradually increased to full strength. In contrast, in a cut there is an instantaneous transition from one image to the other, rather than the smooth blending as in the lap dissolve. In the cut the slides are shown one after the other. However, the lamp is dimmed during the very short period, for example, 1 to 2 seconds that it takes to change from one slide to another. An example of a program is as follows:

EXAMPLE

Left projector lamp on, cut followed 1 second later by another cut followed 1 second later by a lap. To accomplish that program the dissolver instrument will cut the visual image from the right projector onto the screen for 1 second, cut back to the left visual image for 1 second, and then dissolve to the right visual image followed by an advance of the slide of the left projector.

Figure 2:
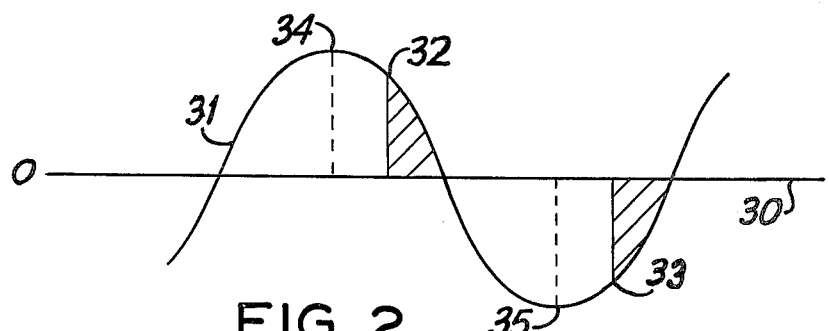
FIG. 2 is an illustration of an electrical wave which shows the meaning of phase control.
Figure 3:
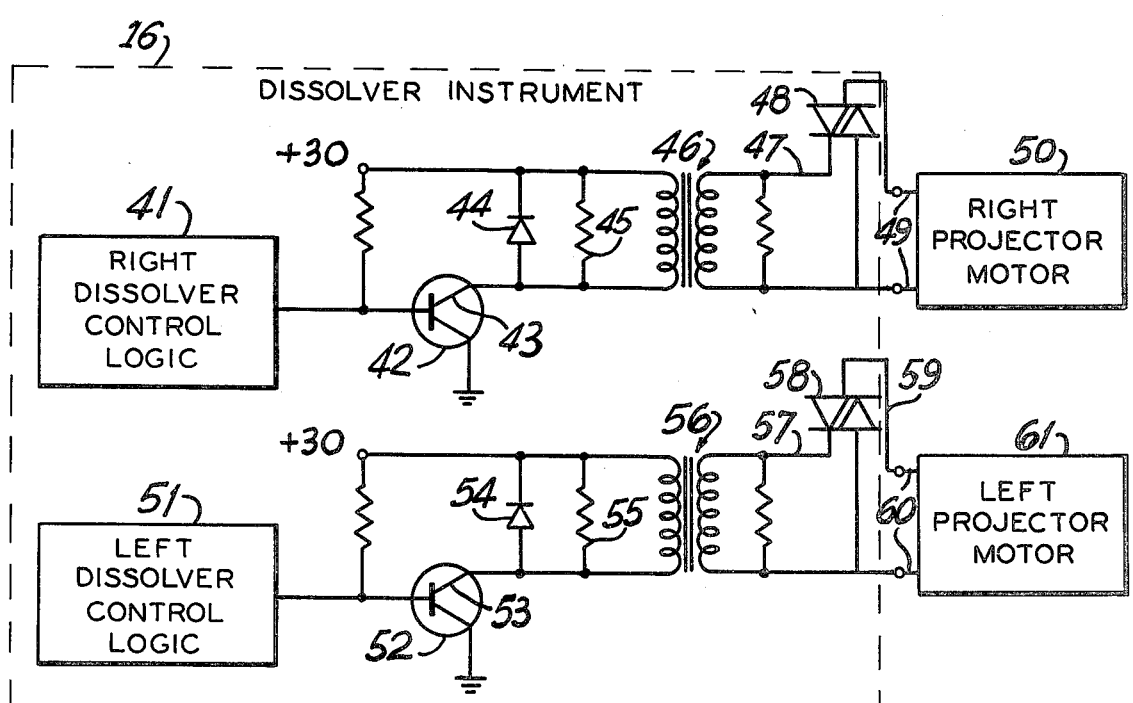
FIG. 3 is a diagram, partially in block diagram and partially in circuit diagram, showing the phase control of the average current as utilized in the present invention.

The relevant portion of the circuitry of the dissolver instrument and its connection to the two projectors are shown in FIG. 3 and its method of control is explained in connection with the electrical wave form shown in FIG. 2.

As shown in FIG. 2, the dissolver instrument operates by means of "phase control." In phase control there occurs a rapid on-off switching of the alternating current so that the load is connected to the a.c. supply for a controlled fraction of each cycle. This control of the fraction of the cycle controls the average power to the load. Phase control is accomplished by regulating the phase angle of the recurring a.c. waves at which the control device, for example, the thyristor, is triggered. The control device, for example, the thyristor, will then conduct for the remainder of the half cycle.

FIG. 2 illustrates the phase control utilized with a solid-state full-wave thyristor, which is a "triac." A triac is, in effect, two SCR's (signal control rectifiers) in a back-to-back relationship so that both the positive and negative excursions of the a.c. wave are controlled. As shown in FIG. 2 the a.c. wave 31 is a sine wave which crosses the zero line 30. The triac is controlled so that it conducts starting at points 32 and 33 and there occurs a power output only for that portion of the respective positive and negative waves which is after the turn-on points 32,33, that extent of power being shown by crosshatching. If the average power is to be increased, the phase angle would be changed and the turn-on points occur earlier as illustrated by the points 34 and 35.

A typical dissolver instrument circuit utilized in the system of the present invention is shown in FIG. 3. As shown, the dissolver instrument 16 is adapted to be connected to two photographic film slide projectors, called for convenience a "right projector" and a "left projector." Each of the projectors is separately controlled and each is connected to the dissolver instrument 16.

The dissolver instrument 16 has a right dissolver control logic 41 comprising a series of solid-state logic gates which are connected to manual and automatic switches. The right dissolver control logic 41 is connected to the base of transistor 42 whose output through its collector 43 is to diode 44, resistor 45 and to the primary winding of a transformer 46. The secondary winding of the transformer 46 is connected to the control terminal 47 of the triac 48. The output of the triac 48 is the output of the dissolver instrument to the right projector and is through a detachable cable 49 to the right projector motor means 50, described in further detail below. In a similar manner the left dissolver control logic 51 is connected to the base of a transistor 52 whose output on collector 53 is connected to a diode 54, a resistor 55 and to the primary winding of the transformer 56. The secondary winding of the transformer 56 is connected to the control electrode 57 of a second triac solid-state device 58. The output of the triac 58, on the line 59, is connected by the removable connecting cable 60 to the left projector motor means 61.

The right dissolver control logic 41 supplies a control signal to the transistor 42. That control signal, by means of the transformer 26 and the phase control of triac 48, provides control of the average power output of the right projector. Consequently, the right projector motor means 50, as the load, receives a phase control of its average input power. In a similar manner the left dissolver control logic 51 controls the average power to the left projector motor means 61.

As shown in FIG. 4, the terminals 71 and 72 are the input terminals of the motor means and are connected to a 110-volt a.c. line. These terminals correspond to the terminals connected to the cable 49 as shown in FIG. 3. The terminal 71 is connected through a current limiting resistor 73 to a full-wave bridge rectifier 74. The full-wave bridge rectifier 74 receives an input, which is a phase controlled a.c. positive and negative wave, from the triac or other thyristor device of the dissolve instrument and produces d.c. current whose amplitude is directly related to the incoming average a.c. current.

The full-wave bridge rectifier 74 is connected to the motor 75 by leads 76 and 77. The motor 75 has a rototable output rotor 78. The rotor 78 in turn is fixed to a linkage member 79. The linkage member is connected to the movement means which comprises, as shown in FIG. 4, a louvre 80. The louvre 80 consists of an operating bar (not shown) connected to the linkage 79. The operating bar moves within the top channel 81. The top channel 81 and the bottom channel 82 are fixed members connected to the projector. A number of angularly rotatable slats 83 are positioned for movement between the channels 81 and 82, which slats are thin, opaque rigid members, for example, of steel. Preferably there are 10 or more such slats, although for purposes of illustration fewer are shown in FIG. 4. The slats rotate into and away from the plane of the drawing.

As shown in FIG. 5, an arc lamp 85 within the projector is positioned so that its light falls on the louvre 80. Slats 83 of the louvre are aligned parallel to the central axis of the arc lamp 85. Consequently, practically all of the light will pass through the louvre and reach the film gate 86. In contrast, in FIG. 6 the louvre slats 83 are angled in relationship to the optical axis 87 so that only a portion of the light reaches the film gate 86.

An alternative movement means is shown in FIG. 7 and consists of a conventional type of diaphragm spiral iris 90. The iris has flat overlapping members 91 which are brought together or moved apart by an exterior ring 92. The exterior ring is rotated through gear 93 by means of the motor 95 and the gear 93, rotating ring 92 which in turn opens the iris diaphragm 90. As another alternative (not shown) a variable density filter between the arc lamp and the film gate may be moved by the motor means to act as a light valve movement means.

The motors 95 and 75 are of the type which is responsive to an average current. Preferably the motor is a moving iron galvanometer motor of the type shown in FIG. 8. As shown in that figure the drive coils 100 and 101 are connected to the leads 76 and 77 and receive the d.c. current from the full-wave bridge rectifier 74. The galvanometer has two fixed armature members 102 and 103 which are positioned opposite to each other to form an air gap 104 in which the rotor 105 (rotating armature) is rotatably mounted on bearings. The rotor 105 has a torsional return spring (not shown) to return it to its central normal position in the absence of a current through the drive coils 100 and 101. The armatures 102 and 103 are separated on opposite sides by permanent magnets 106 and 107. An application of d.c. current to the drive coils 100 and 101 causes the rotor to move in the direction of the arrow. The rotor movement, due to electromagnetic torque, it linearly proportional to coil current and independent of its rotation.

In the embodiment illustrated in the figures, the rotor under current control moves only in one direction and may move anywhere from 0 to +15 degrees as a direct function of the average input current. This type of motor is somewhat unusual in that if the average current is sufficient to move the rotor only half of its excursion, i.e., 7½ degrees, the rotor may stay there for a long period without adverse effect.

Although the moving iron galvanometer has been shown in FIG. 8, other types of motors may alternatively be used. For example, the motor may be a moving coil galvanometer motor, i.e., a d'Arsonval movement or a spring opposed brushless d.c. torque motor, or a rotational motor, such as a step motor, having a servo feedback loop. Alternatively and as illustrated in FIG. 9, other types of motors may also be used. As shown in that figure, the input terminals 110 and 111 are connected to a current sensing control circuit. This type of control circuit may be, as shown in FIG. 4, a full-wave bridge rectifier or alternatively may be a controlled multivibrator or a circuit having internal logic which would convert the incoming average current level into a digital signal. The current sensing control circuit 112 is connected to the motor means 113. In the case of the digital control, the motor means may be a step motor or the motor may be a galvanometer type motor whose rotor operates in both directions to move the movement means.

What is claimed is:

1. A system for the projection of photographic film comprising:
    a plurality of photographic film projectors;
    a dissolver instrument connected to said projectors and to a source of a.c. power, said dissolver instrument including power control means to regulate by phase control its average output power to said projectors;
    at least one of said projectors having an arc lamp light source and a film gate and a light valve means positioned between said arc lamp and said film gate;
    said light valve means attenuating the arc lamp light reaching the film from zero to full intensity and changing such intensity at a controlled rate of speed, said light valve means comprising a motor means connected to said dissolver instrument, said motor means having a rotor means whose angle of rotation is linearly related to said average output power, and movement means connected to said rotor means and moved thereby at a controlled rate of speed to relatively open, closed and intermediate positions dependent upon the angular position of said rotor means.

2. A system as in claim 1 wherein said motor means is a galvanometer motor device.

3. A system as in claim 2 wherein said galvanometer motor drive is a moving iron galvanometer motor.

4. A system as in claim 1 wherein said movement means is a louvre comprising an operating bar connected to said rotor means and a parallel plurality of opaque slats which are pivotally linked to said operating bar and moved simultaneously to the same angle by the movement of said operating bar.

5. A system as in claim 1 wherein said movement means is an iris having overlapping opaque flat members, and an external movement ring linked to said rotor means.

6. A system as in claim 1 wherein said arc lamp is a xenon arc lamp.

7. A system as in claim 1 wherein said power control means includes a triac as its regulating device.

8. A high lumen output photographic film slide projector adapted to be connected along with other slide projectors to a dissolver instrument, the output of said dissolver instrument being a phase control of average output power; said projector comprising:
   an arc lamp light source;
   a motor driven slide transport mechanism;
   a film gate in proximity to the slide in said transport mechanism to be projected;
   a light valve means comprising a motor means connected to said dissolver instrument, said motor means having a rotor whose angle of rotation is linearly related to said average output power and a movement means connected to said rotor and positioned between said arc lamp and said film gate and moved by said rotor to relatively open, closed and intermediate positions dependent upon the rate of speed and angular position of said rotor to control the amount of light reaching the film gate from the arc lamp.

9. A projector as in claim 8 wherein said motor means is a galvanometer motor device.

10. A projector as in claim 9 wherein said galvanometer motor device is a moving iron galvanometer motor.

11. A projector as in claim 8 wherein said movement means is a louvre comprising an operating bar connected to said rotor and a parallel plurality of opaque slats each of which is pivotally linked to said operating bar, said slats being moved simultaneously to the same angle by the movement of said operating bar.

12. A projector as in claim 8 wherein said movement means is an iris having overlapping opaque flat members and an external ring linked to said rotor.

13. A projector as in claim 8 wherein said arc lamp is a xenon arc lamp.

* * * * *